United States Patent [19]
Wang et al.

[11] Patent Number: 6,101,236
[45] Date of Patent: Aug. 8, 2000

[54] ITERATIVE METHOD AND APPARATUS FOR X-RAY COMPUTED TOMOGRAPHIC FLUOROSCOPY

[75] Inventors: Ge Wang, Iowa City; Gary D. Schweiger, Cedar Rapids; Michael W. Vannier, Iowa City, all of Iowa

[73] Assignee: University of Iowa Research Foundation, Iowa City, Iowa

[21] Appl. No.: 09/165,370

[22] Filed: Oct. 2, 1998

[51] Int. Cl.[7] .................................................. A61B 6/03
[52] U.S. Cl. .................................................. 378/4; 378/901
[58] Field of Search .............................. 378/4, 8, 15, 901

[56] References Cited

U.S. PATENT DOCUMENTS

| | | | |
|---|---|---|---|
| 5,155,365 | 10/1992 | Cann et al. | 250/363.02 |
| 5,296,708 | 3/1994 | Moyers et al. | 250/363.03 |
| 5,338,936 | 8/1994 | Gullberg et al. | 250/363.04 |
| 5,376,795 | 12/1994 | Hasegawa et al. | 250/363.04 |
| 5,513,237 | 4/1996 | Nobuta et al. | 378/19 |
| 5,566,218 | 10/1996 | Nobuta et al. | 378/20 |
| 5,568,530 | 10/1996 | Saito et al. | 378/4 |
| 5,640,436 | 6/1997 | Kawai et al. | 378/4 |
| 5,654,995 | 8/1997 | Flohr | 378/10 |
| 5,661,772 | 8/1997 | Bar et al. | 378/20 |
| 5,663,995 | 9/1997 | Hu | 378/15 |
| 5,668,846 | 9/1997 | Fox et al. | 378/4 |
| 5,694,446 | 12/1997 | Shinohara | 378/4 |
| 5,699,399 | 12/1997 | OzakI | 378/4 |
| 5,708,690 | 1/1998 | Hsieh | 378/4 |
| 5,708,691 | 1/1998 | Zmora | 378/4 |
| 5,732,117 | 3/1998 | Sato et al. | 378/15 |
| 5,739,539 | 4/1998 | Wang et al. | 250/363.03 |
| 5,742,056 | 4/1998 | Valentino et al. | 250/363.03 |
| 5,744,802 | 4/1998 | Muehllehner et al. | 250/363.03 |
| 5,750,991 | 5/1998 | Moyers et al. | 250/363.03 |
| 5,751,788 | 5/1998 | Khutoryansky et al. | 378/197 |
| 5,909,476 | 6/1999 | Cheng et al. | 378/4 |

FOREIGN PATENT DOCUMENTS 2 192 120   12/1987   United Kingdom .

OTHER PUBLICATIONS

"Iterative Deblurring for CT Metal Artifact Reduction," Ge Wang, Donald L. Snyder, Joseph A. O Sullivan and Michael W. Vannier, pp. 657–664, IEEE Transactions on Medical Imaging , vol. 15, No. 5 Oct. 1996.

"Accelerating The EMML Algorithm and Related Iterative Algorithms by Rescaled Block–Iterative Methods," Charles L. Byrne, pp. 100–109, IEEE Transactions on Image Processing, vol. 7, No. 1, Jan. 1998.

"A Row–Action Alternative to the EM Algorithm for Maximizing Likelihoods in Emission Tomography," Jolyon Brown and Alvaro R. DePierro, pp. 687–699, IEEE Transactions on Medical Imaging, vol. 15, No. 5, Oct. 1998.

*Primary Examiner*—David V. Bruce
*Attorney, Agent, or Firm*—Needle & Rosenberg, PC

[57] ABSTRACT

In the present invention, an iterative process is provided for computed tomographic fluoroscopy (CTF) based upon an ordered-subset based algorithm or an adaptation of the row-action expectation maximization (RAEM) formula. This process is applied to reduce metal artifacts in CTF imaging, reduce image noise and provide rapid-image updating suitable for real-time applications. In one embodiment, generation of a projection mask and computation of a relaxation matrix are used to compensate for beam divergence and data incompleteness, and a priori knowledge such as a known image support is used to reduce image reconstruction errors.

46 Claims, 7 Drawing Sheets

ITERATIVE METHOD AND APPARATUS FOR X-RAY COMPUTED TOMOGRAPHIC FLUOROSCOPY

This invention was made in part with government support under the following grants: DK50184 and NS35368, awarded by the National Institutes of Health. The government has certain rights in the invention.

BACKGROUND OF THE INVENTION

1. Field of Invention

The present invention generally relates to an apparatus and method for reconstructing images in computed tomographic fluoroscopy, and particularly to an iterative process for performing this functionality in real-time applications utilizing a row-action or modified ordered-subset expectation maximization algorithm or other ordered-subset based algorithms in fan-beam or cone-beam geometry.

2. Description of Prior Art

X-ray computed tomographic fluoroscopy (CTF) has been applied in a variety of real-time application domains, particularly, image guided medical intervention. Specific example applications include evacuation of intracranial blood clots, radiodense rod and seed placement for brachytherapy, synchronization of scanning with contrast bolus arrival for dynamic scanning, and motion analysis. Typical CTF systems incorporate an x-ray source projecting a fan-shaped beam within a single X-Y plane referred to as the imaging plane. The beam passes through the subject, such as a patient in a medical procedure, thereby attenuating the beam which ultimately strikes an array of x-ray detectors. The individual detectors generate electrical signals corresponding to the beam attenuation at the particular detector location.

Known third generation CTF systems include a gantry which allows rotation of the x-ray source and detector array around the subject in the imaging plane. The projection data collected at a particular gantry angle is referred to as a view, and a typical scan of the subject consists of the projection data associated with a set of views collected during a complete rotation of the gantry. A partial scan consists of a subset of projection data associated with views comprising less than a complete rotation of the gantry. The projection data associated with a scan may be used to generate a two-dimensional image using a process referred to as filtered backprojection (FB). This image reconstruction technique requires computationally expensive filtration followed by backprojection.

Currently, filtered backprojection is the method for CTF image reconstruction. However, this method of image reconstruction suffers from metal artifacts resulting from metallic implants, surgical probes or other metallic instruments. Further, utilization of low tube currents in medical applications may lead to increased image noise; FB reconstruction does not provide compensation for this increased image noise.

A maximum likelihood (ML) expectation maximization (EM) approach provides an alternative for image reconstruction that reduces both metallic artifacts and image noise resulting from low current. The problem with this technique, however, is the computational expense due to the simultaneous iterative nature of the algorithm. This computational expense renders this approach not viable in the field of CTF real-time applications where image reconstruction must occur rapidly.

A row-action alternative to the EM formula was developed for maximum likelihood reconstruction in emission CT. This alternative greatly reduces the computational expense of the traditional EM approach. In simulated tests, iterations 1, 2, 3 and 4 of the row-action alternative provided results at least as good as iterations 45, 60, 70 and 80, respectively, of the traditional EM approach (Browne J, De Pierro A R: A row-action alternative to the EM algorithm for maximizing likelihoods in emission tomography. IEEE Trans. Med. Imag. 15:687–699, 1996).

The current invention utilizes an ordered-subset based algorithm, such as row-action EM, in fan-beam or cone-beam geometry to reduce metal artifacts and image noise while attaining image reconstruction speeds faster than FB in the CTF context.

SUMMARY OF THE INVENTION

In the present invention, an iterative process is provided for computed tomographic fluoroscopy (CTF) based upon an ordered-subset based algorithm or an adaptation of the row-action expectation maximization (RAEM) formula. This process is applied to reduce metal artifacts in CTF imaging, reduce image noise and provide rapid-image updating suitable for real-time applications. In one embodiment, generation of a projection mask and computation of a relaxation matrix are used to compensate for beam divergence and data incompleteness, and a priori knowledge such as a known image support is used to reduce image reconstruction errors.

DETAILED DESCRIPTION OF THE INVENTION

Figure 1:
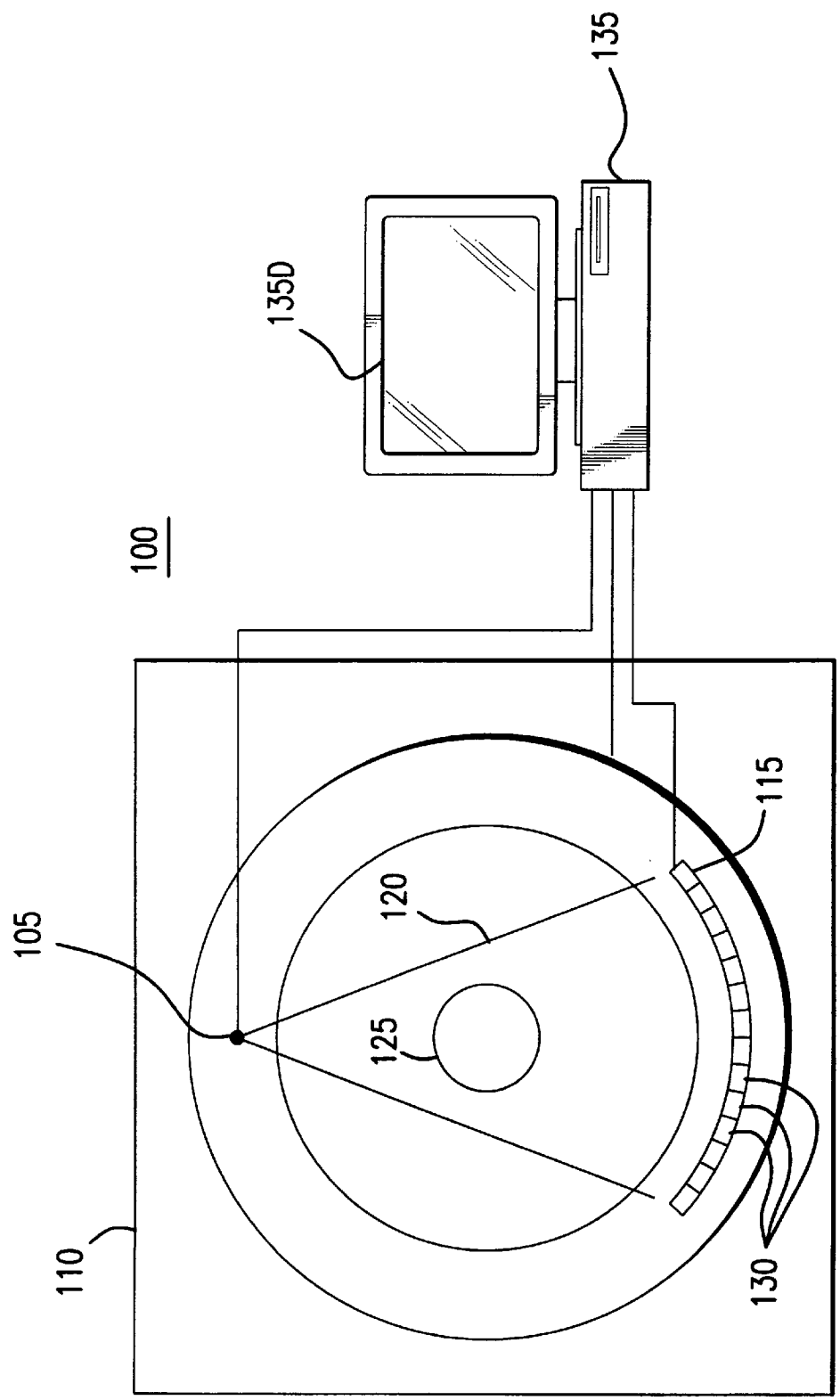
FIG. 1 provides a schematic diagram of a device that may incorporate the present invention.

In an embodiment, the present invention may be implemented in conjunction with a fan-beam x-ray tomographic system, such as depicted schematically in FIG. 1.

As shown in FIG. 1, the x-ray tomographic system 100 that may be used in the present invention uses a gantry 110. The gantry 110 contains an x-ray point source 105 that projects a beam 120 at a detector array 115 on the opposite side of the gantry 110. The beam 120 passes through the subject 125, and the individual detectors 130 within the detector array 115 sense the attenuation of the beam 120 passing through the subject 125. The detectors 130 generate electrical signals corresponding to the attenuation, and the x-ray source and detector assembly rotates about the subject 120 to generate projection data.

The detectors 130 transmit the projection data to the computer system 135, which reconstructs an image from the projection data. The computer 135 transmits this image to a sub-system for display, and possible archiving, which in one embodiment might be the computer's display 135D. In an embodiment, the computer 135 may comprise a Silicon Graphics $O_2$ computing platform (Silicon Graphics, Inc.; Mountain View, Calif., USA), or any other suitable single or multiprocessor computing system.

In a real-time usage of this system, an initial preoperative scan may be performed to generate a base image. The projection data for this scan is transmitted to the workstation 135, which creates an initial image and further applies a translation to the image to guarantee nonnegativity as required by the iterative RAEM approach. Subsequent images are generated utilizing an iterative RAEM approach from the current image and subsequent projection data.

In a two-dimensional CT problem, the cross-section of the subject is divided into n abutting square pixels with constant x-ray linear attenuation coefficients $x_j$, $j=1, \ldots, n$; x represents the corresponding n-dimensional vector. Suppose that projection data $b_i$ are measured along m lines, $i=1, \ldots, n$; b represents the corresponding m-dimensional vector. Let $A=(a_{ij})$ describe the contribution of $x_j$ to $b_i$, $i=1, \ldots, n$, $j=1, \ldots, n$ resulting in the following linear system:

$$Ax = b$$

The EM formula for inverting this system is $$x_j^{(k+1)} = \frac{x_j^{(k)}}{\sum_{i=1}^{m} a_{ij}} \sum_{i=1}^{m} \frac{a_{ij} b_i}{\langle a_i, x \rangle}, \quad j = 1, \ldots, n$$

where k represents the iteration number.

The RAEM formula can be expressed as $$x_j^{(k,i)} = x_j^{(k,i-1)} + \lambda_k x_j^{(k,i-1)} \sum_{l \in S_i} a_{lj} \left( \frac{b_l}{\langle a_l, x^{(k,i-1)} \rangle} - 1 \right),$$

$$i = 1, \ldots, p; j = 1, \ldots, n,$$

where $$x^{(k,0)} = x^{(k-1,p)}, \bigcup_{i=1}^{p} S_i = [1, \ldots, m], 0 < \lambda_k c_{ij} \leq 1, c_{ij} = \sum_{l \in S_i} a_{lj}.$$

and k represents the iteration number.

A CTF algorithm based upon the RAEM formula results by setting $$\lambda_k = \frac{1}{\sum_{l \in S_i} a_{lj}}$$

and obtaining $$x_j^{(k,i)} = \frac{x_j^{(k,i-1)}}{\sum_{l \in S_i} a_{lj}} \sum_{l \in S_i} a_{lj} \frac{b_l}{\langle a_l, x^{(k,i-1)} \rangle}, \quad i = 1, \ldots, p; j = 1, \ldots, n$$

where k represents the iteration number.

The CTF problem can be characterized as real-time tomographic reconstruction of an image that continuously undergoes localized changes. Because of the real-time nature of CTF, projection data must be continuously collected, and images must be reconstructed and updated from consecutive partial scans $S_i$, $i=1, 2, \ldots, p$, which consists of q consecutive projections, where q is a constant optimized for the particular real-time application.

The following analysis examines the convergence behavior of the row-action EM formula in the early stage. By "the early stage", we mean that projection data involved for image reconstruction are less than that from a half-scan.

Figure 7:
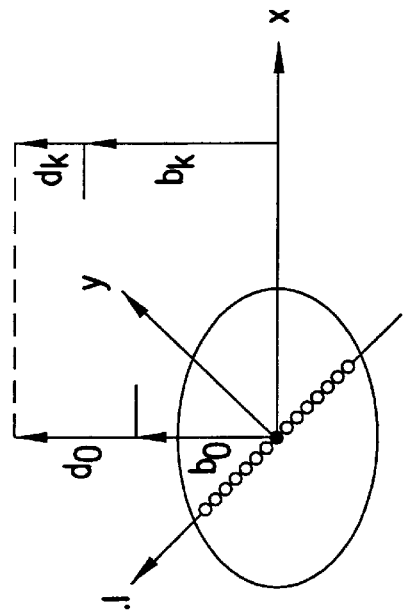
FIG. 7 displays the convergence behavior of the RAEM algorithm.

First, we consider a homogeneous disk with a CT value $b_0$ that is centered at the origin of the reconstruction system, as shown in FIG. 7. Let us model a localized image variation as an incremental change $d_0$ at the origin, and consider those X-rays that pass through the origin. Due to the incremental change, the true ray-sum becomes $p+b_0+d_0$, where p denotes the ray-sum along the same path excluding the contribution from the origin. Applying the row-action EM reconstruction formula with projections in $S_1$, we have $$\begin{cases} b_1 = b_0 p + b_0 + \dfrac{d_0}{p + b_0} = b_0 + \dfrac{b_0}{p + b_0} d_0 \\ d_1 \equiv (b_0 + d_0) - b_1 = \dfrac{p}{p + b_0} d_0 \end{cases}$$

Generally, after applying the row-action EM reconstruction formula with projections in $S_{k+1}$, we have $$\begin{cases} b_{k+1} = b_k + \dfrac{b_k}{p + b_k} d_k \\ d_{k+1} \equiv (b_k + d_k) - b_{k+1} = \dfrac{p}{p + b_k} d_k \end{cases}$$

Hence, $$d_k = |d_0| \prod_{i=0}^{k-1} \frac{p}{p + b_i} < \begin{cases} d_0 \left( \dfrac{p}{p + b_0} \right)^k \to 0, & d_0 > 0 \\ -d_0 \left( \dfrac{p}{p + b_0 + d_0} \right)^k \to 0, & d_0 < 0 \end{cases}$$

That is, $d_k$ vanishes monotonically and exponentially.

Several comments are in order. First, in practice the time-varying pixel may not be at the origin. For an arbitrary pixel location, projection values associated with the rays through the pixel are generally not the same. In this case, the error bounds for $d_k$ can be easily obtained by replacing p with $p_{max}$ because $p/(p+c)$ is an increasing function of p for p, c>0. As a result, the exponential convergence of the row-action EM formula still holds. Second, the disk may be inhomogeneous. Consequently, various projection values through a specific pixel can be different. Similarly, we can replace p with $p_{max}$ and still enjoy the exponential convergence. Third, if we consider not only the rays through the origin but also all other rays, interactions among over- and under-corrected values of all the pixels in the field of view will affect the correction at a given point. However, it can be shown that discrepancy at a pixel on a radial line through the point is $$O\left(\alpha \equiv \frac{b_0}{p+b_0}\right),$$

, which is very small in practice. For those pixels that are not on such a radial line, the discrepancies are even smaller, which are in $O(\alpha^2)$. Hence, these perturbations would not alter our conclusion on the convergence behavior of the row-action EM.

Figure 2:
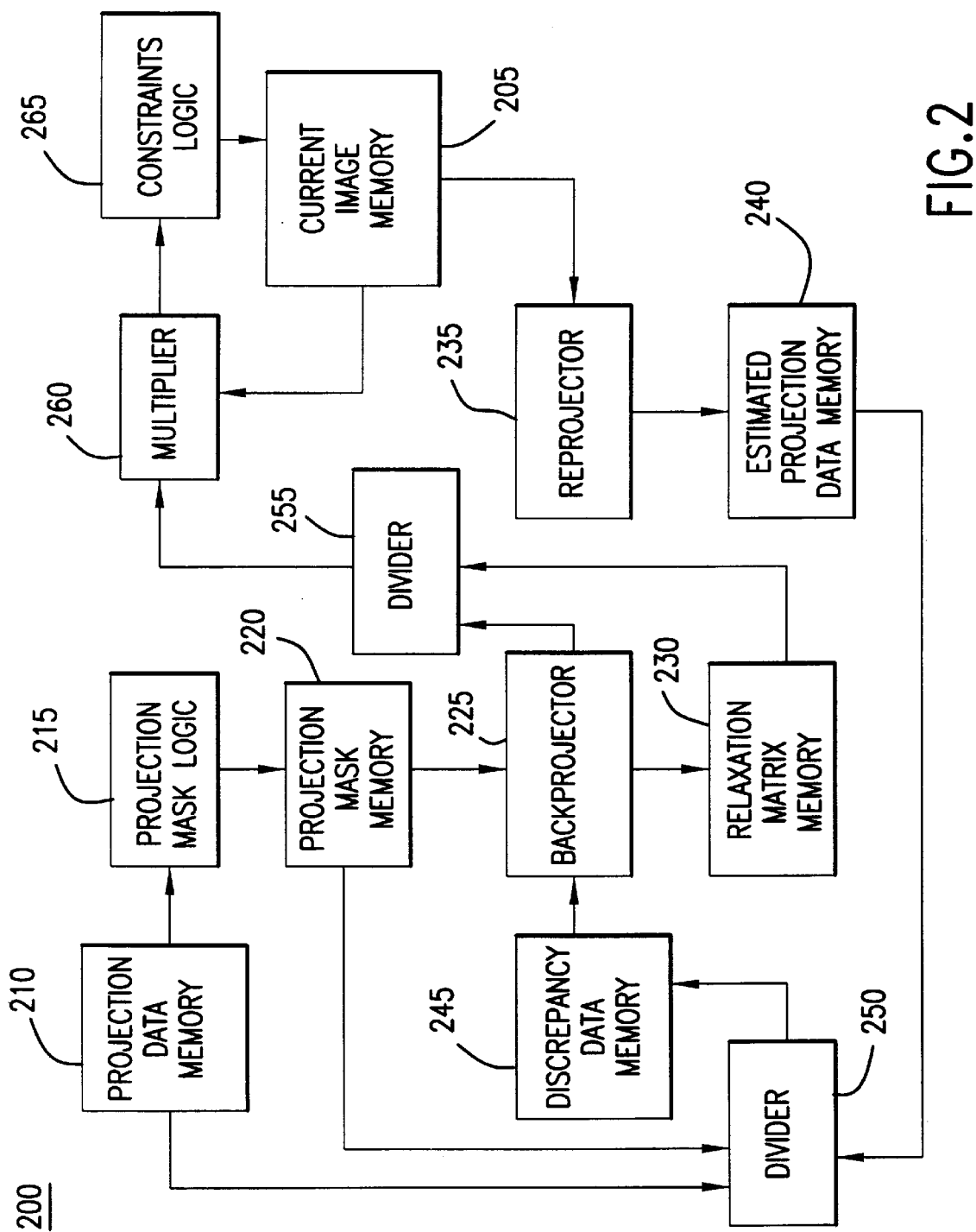
FIG. 2 is a block diagram of the components that may be used to implement the present invention.

FIG. 2 provides a block diagram for an apparatus 200 implementing the iterative RAEM image reconstruction according to the present invention. In one embodiment, this apparatus could be integrated into the computer 135 of FIG. 1 as a specialized hardware element. The apparatus of FIG. 2 is described in further detail as follows.

First, a positive image of the subject is loaded into the current image memory 205. Either a positive constant image or an image generated from a preoperative scan and translated to guarantee non-negativity are examples of suitable images. A projection mask is created by the projection mask logic 215 from the most recent partial projection data of a pre-specified size stored in the projection data memory 210. The projection mask is stored in the projection mask memory 220. A relaxation matrix is generated from the projection mask utilizing the backprojector 225 and is stored in the relaxation matrix memory 230.

A reprojector 235 is used to generate estimated projection data based upon the image stored in the current image memory 205. The generated estimated projection data is stored in the estimated projection memory 240. Discrepancy data is created and stored in the discrepancy data memory 245 using a divider 250, the projection data in the projection data memory 210 and the estimated projection data in the estimated projection data memory 240.

The discrepancy data in the discrepancy data memory 245 is backprojected by the backprojector 220 over the image reconstruction grid to produce a backprojected image. The backprojected image is pixel-wise divided using a divider 255 by the relaxation factor stored in the relaxation matrix memory 230 and then pixel-wise multiplied using a multiplier 260 by the image stored in the current image memory 205. A priori knowledge, such as known image support, can be enforced upon the updated image utilizing the constraint logic 265 which ultimately passes an updated image to the current image memory 205. The reconstruction errors may be estimated in either the image or projection domains.

It is emphasized that the CTF method of the present invention can also be implemented using other ordered-subset based algorithms. An example is given below. Let us repeat the EM formula for emission CT as follows:

$$x_j^{(k+1)} = \frac{x_j^{(k)}}{\sum_{i=1}^{m} a_{ij}} \sum_{i=1}^{m} \frac{a_{ij} b_i}{\langle a_i, x \rangle}, \quad j = 1, \ldots, n$$

This EM formula has a geometrical explanation. Ratios between measured and predicted data are used to correct a guess to the underlying function. If difference, instead of ratio, is used to quantify discrepancy between measured and predicted data, the following additive iterative deblurring equation can be obtained:

$$x_j^{(k+1)} = x_j^{(k)} \frac{1}{\sum_{i=1}^{m} a_{ij}} \sum_{i=1}^{m} \frac{a_{ij}(b_i - \langle a_i, x \rangle)}{\sum_{j'=1}^{n} a_{ij'}}, \quad j = 1, \ldots, n$$

An ordered-subset algorithm can be similarly developed for this additive iterative deblurring formula.

Figure 3:
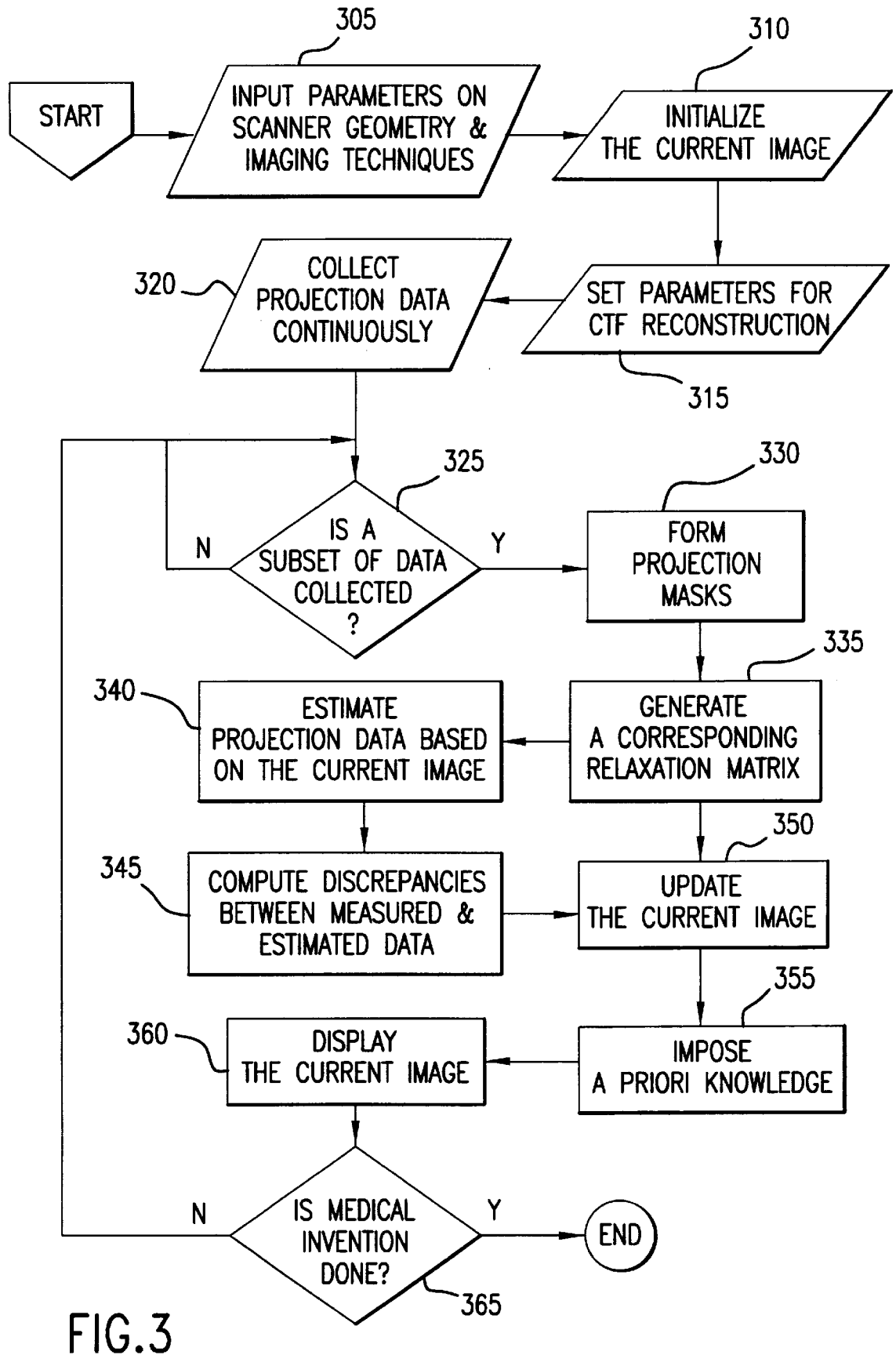
FIG. 3 is a flowchart of the process of RAEM tomographic image reconstruction according to the present invention.

FIG. 3 displays a flowchart of the iterative RAEM reconstruction process of the present invention. Again, this process may be performed by the computer 135 of FIG. 1, which in an embodiment may be a Silicon Graphics $O_2$ computing platform, as previously described. The process depicted in FIG. 3 is described in further detail as follows.

First, in step 305 all the parameters of the scanner geometry and the imaging techniques are input. The parameters of the scanner geometry include the source-to-isocenter distance, the detector-to-isocenter distance, the fan-beam angle, the number and positions of the detectors, and so on. The parameters of the imaging techniques include the tube voltage and current, the dimensions of the field of view, the pixel size, and the dynamic range of reconstruction. Next, in step 310 the current image of the field of view is initialized. Either a pre-operative CT image of the same patient or a positive constant image can be used. If a pre-operative CT image is used, an appropriate translation is needed to make sure the image is nonnegative, which is required by the RAEM formula, and also is consistent to the underlying physics. The parameters specific to the CTF reconstruction such as the size of each subset and the threshold for determining if photo readings are significant are entered in step 315.

Because of the real-time nature of CTF, projection data must be continuously collected, and images be reconstructed and updated from consecutive partial scans. Therefore, we require that a partial scan consist of q consecutive projections, where q is a constant, and should be optimized according to applications. When x-ray dense objects, such as metal parts, exist in the region scanned by the fan-beam, x-ray photos can be blocked so they cannot reach detectors, and a threshold is needed to decide whether or not detectors are completely shadowed.

In step 320, a scanner is turned on to collect raw data continuously while a medical intervention is being performed. In reference to the subset size, the data acquisition process is monitored to wait for the most recent subset of data collected in step 325.

When a subset of data has accumulated in step 325, the process continues with step 330, where based on the recently collected subset of data and the pre-specified threshold, a projection mask is formed for each projection in the subset. Each element of this characteristic projection mask denotes whether or not significant measurement is made from the source to a detector. A projection mask is associated with an x-ray opaque object. Available x-rays are those not blocked by the metal. To take inhomogeneousness of cone-beam data into account, a relaxation function $$\left(\text{the discrete version of } \sum_{i=1}^{m} a_{ij}\right)$$

is generated from the projection mask, the imaging geometry and the scanning locus. A relaxation matrix is formed in a backprojection manner in step 335. This matrix allows compensation for both beam divergence and data incompleteness.

In step 340, based on the current image, projection data are estimated via reprojection using the ray-tracing method. Next in step 345, real data and estimated data are point-wise divided to produce discrepancies of measured and estimated projection data. The process proceeds with step 350 where the discrepancies are backprojected over the image reconstruction grid to produce a backprojected image, and the backprojected image is then pixel-wise divided by the relaxation factor, which is then multiplied by the current image pixel-wise to update the current image. In step 355, a priori knowledge, such as a known image support, can be enforced upon the updated image, and reconstruction errors may be estimated in image and/or projection domains. In a further embodiment, steps 330 through 355 inclusive may be implemented in special hardware such as parallel processors, or stored as executable instructions in a computer-readable, digital storage device such as memory (RAM, ROM, etc.), a hard disk drive or other media (CD-ROM, floppy disk, magnetic tape, punched card, etc.).

Finally in step 360, the current image is displayed to provide immediate feedback during the real-time application. In step 365, a determination is made as to whether the real-time application is complete. If so, the image reconstruction process ends. If not, steps 320 through 360 are repeated until the real-time application is complete.

Additional details of the reprojection and the backprojection steps discussed above are provided as follows. In either reprojection or backprojection, each of the x-rays may be evenly divided at a specified step length, such as the pixel side length, being consistent to the discrete imaging model. In reprojection, the pixel values of four nearest neighbors of each dividing point contribute to the projection value via bi-linear interpolation. In backprojection, a projection value is additively re-distributed to the four nearest neighbors of each dividing point after weighting with corresponding bi-linear interpolation coefficients.

Figure 4:
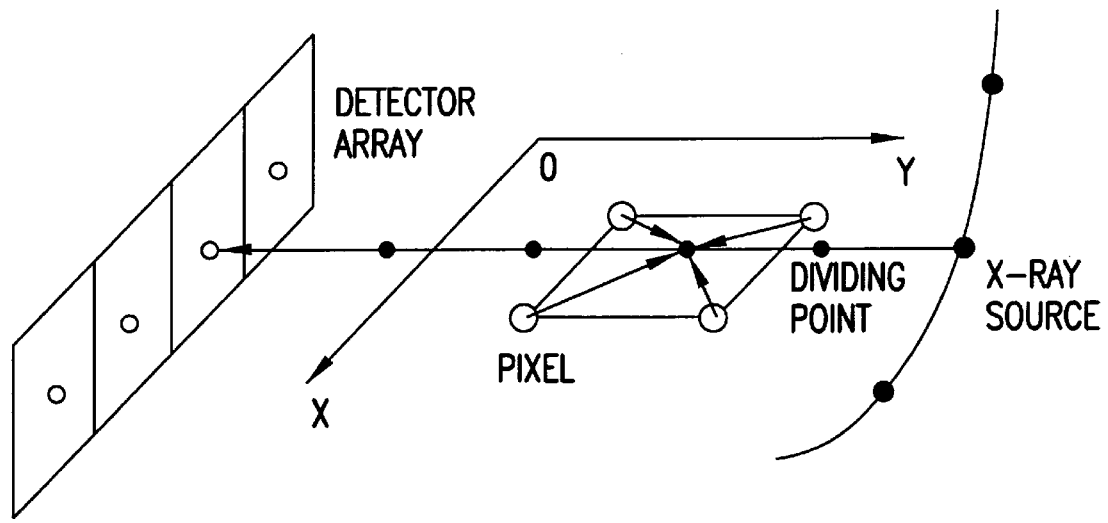
FIG. 4 illustrates the discretized reprojection process.
Figure 5:
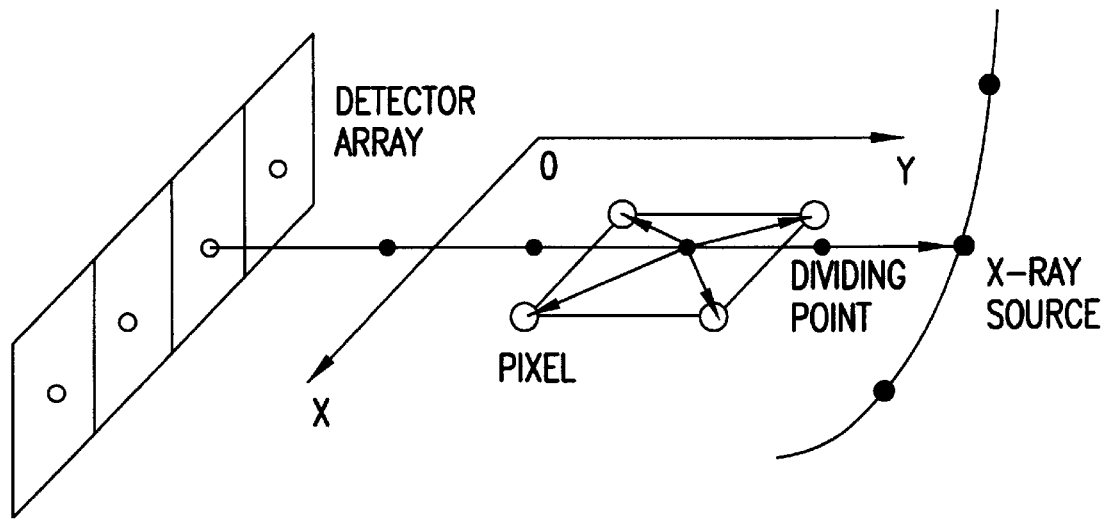
FIG. 5 illustrates the discretized backprojection process.
Figure 6:
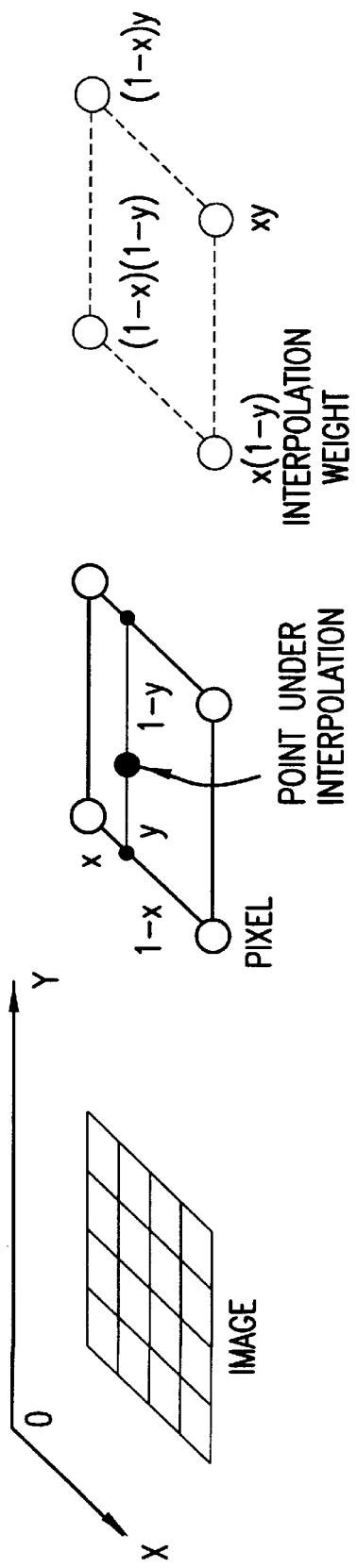
FIG. 6 illustrates the computation of bi-linear interpolation of the four nearest neighbors of an arbitrary point in an image.

Image reconstruction according to the present invention requires both reprojection and backprojection. FIGS. 4 and 5 illustrate reprojection and backprojection processes respectively that may be used in the present invention. Both processes utilize a bi-linear interpolation as depicted in FIG. 6. Interpolation needed in reprojection and backprojection can also be performed in other ways.

In the reprojection process of FIG. 4, each of the x-rays may be evenly divided at a predetermined length, such as the pixel side length. The pixel values of the four nearest neighbors of each dividing point contribute to the projection value via bi-linear interpolation.

In the backprojection process of FIG. 5, each of the x-rays may be also evenly divided at a predetermined length, such as the pixel side length. A projection value is additively re-distributed to the four nearest neighbors of each dividing point after weighting with corresponding bi-linear interpolation coefficients.

We emphasize that our description in the fan-beam geometry can be directly extended into the cone-beam geometry. In the cone-beam case, tri-linear interpolation should be used in the place of bi-linear interpolation.

Numerical simulations were performed on clinical CTF images to demonstrate the effectiveness of the RAEM approach of the present invention. In this simulation, 512 by 512 pixel CTF images were down-sampled to 128 by 128 arrays.

Both the FB and RAEM algorithms were programmed in the IDL programming language (Research Systems; Boulder, Col., USA). The primary operations in both algorithms are reprojection and backprojection; these operations are discussed individually above. In both algorithms the backprojection was implemented via a Riemann function in IDL, which was optimized for speed. Since image values and projection data are available only on grid points, interpolation is needed to compute reprojection values along x-rays as well as backprojection contribution from various orientations. Linear interpolation was used in both processes as discussed above. Other types of interpolation are possible; however, they were not tested in these numerical simulations.

The initial guess was arbitrarily selected to be a positive constant image. Reconstruction was performed using 180 projections, 190 detectors per projection and half-scan data. A point source and point detectors were assumed.

The log conversion in data preprocessing may greatly amplify noise, especially when metal is present. In the case of very poor projection data, the measurement was considered invalid. In the row-action EM-like CTF algorithm, this knowledge was summarized in a projection mask. A matrix of spatially varying relaxation coefficients was synthesized based on the projection mask, and then used to iteratively minimize the I-divergence between the valid projection measures and the predicted counterparts.

Because the Poisson noise model is not valid for x-ray projection data, the noise added in the projection domain was uniform, whose interval was scaled to generate a realistic noisy appearance in CT images via filtered backprojection. The noise removal capability of the RAEM CTF algorithm was tested with not only uniform noise but also Gaussian and Poisson data, and similar results obtained. The tests indicated that the new CTF algorithm is much less sensitive than filtered backprojection. Additionally, the tests demonstrated that the image noise would not be amplified when the scan time was increased, because the image quality is basically determined by the signal-to-noise ratio, which would not be changed by extending the scan time.

Figure 8A:
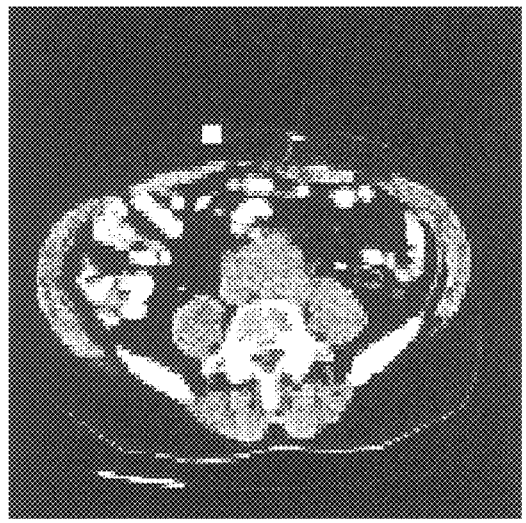
FIG. 8A depicts an idealized, simulated CTF image at time zero of an intervention with a metallic probe.
Figure 8B:
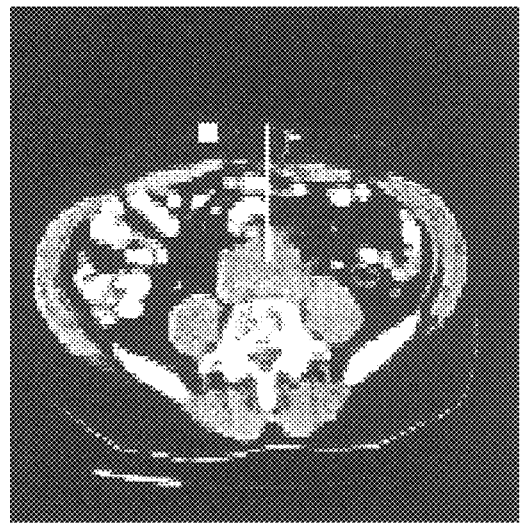
FIG. 8B depicts an idealized, simulated CTF image at ten seconds into an intervention with a metallic probe.
Figure 8C:
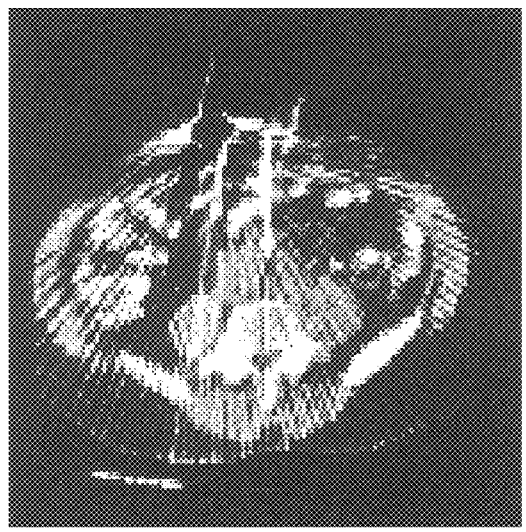
FIG. 8C depicts a simulated CTF image at ten seconds into an intervention with a metallic probe reconstructed using FB.
Figure 8D:
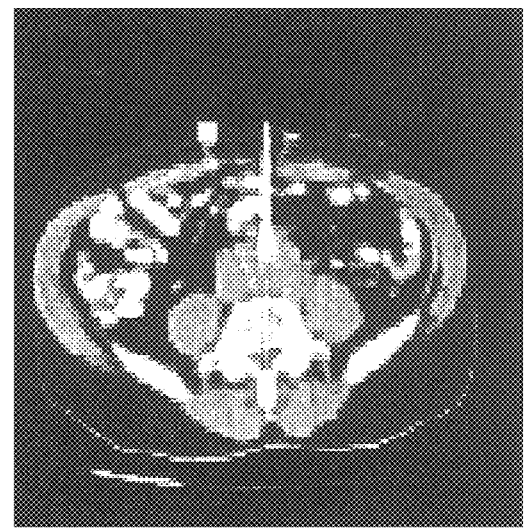
FIG. 8D depicts a simulated CTF image at ten seconds into an intervention with a metallic probe reconstructed using RAEM.

FIGS. 8A–8D depict representative results for suppression of metal artifacts. FIG. 8A shows an actual image with a superimposed metal block at the beginning of a real-time medical intervention. FIG. 8B shows the image of FIG. 8A with an idealized metal needle inserted ten seconds into a simulated, real-time medical intervention. FIG. 8C shows the image of FIG. 8B reconstructed using the FB approach. This image suffers from prominent streaking resulting from metallic artifacts FIG. 8D shows the image of FIG. 8B using the RAEM approach. The metallic artifact streaking in this image is significantly less than the FB produced reconstruction.

Figure 9A:
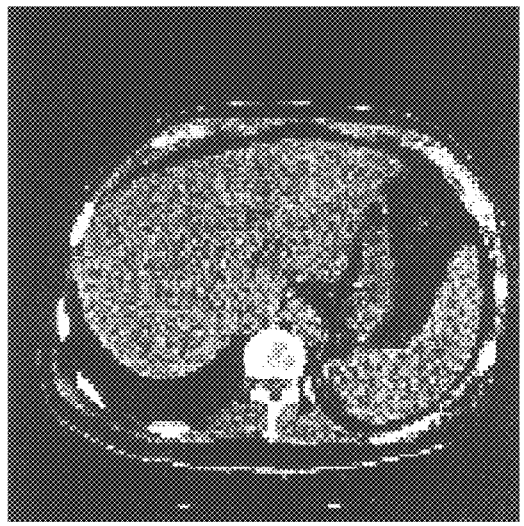
FIG. 9A depicts an idealized, simulated CTF image at time zero of an intervention.
Figure 9B:
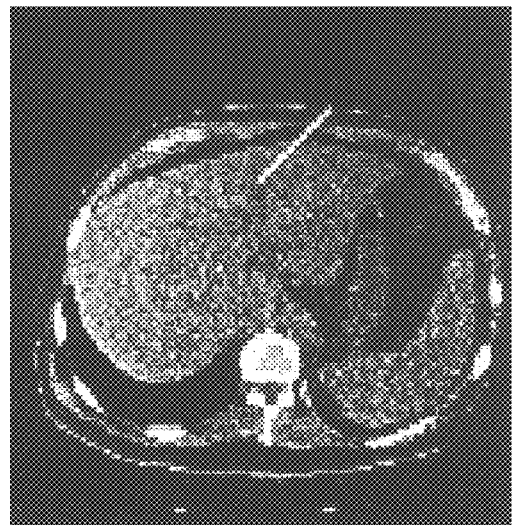
FIG. 9B depicts an idealized, simulated CTF image at eight seconds into an intervention.
Figure 9C:
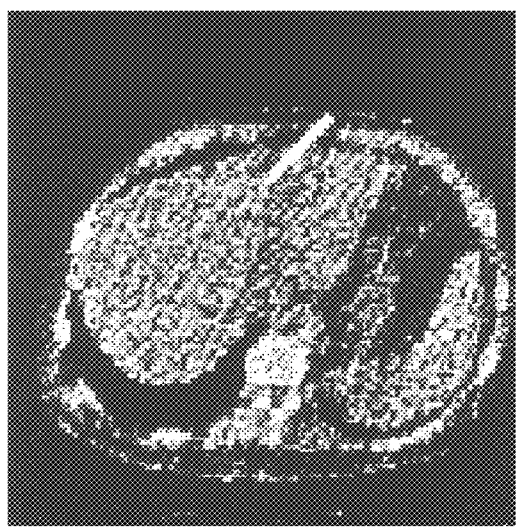
FIG. 9C depicts a simulated CTF image with low contrast at eight seconds into an intervention reconstructed using FB.
Figure 9D:
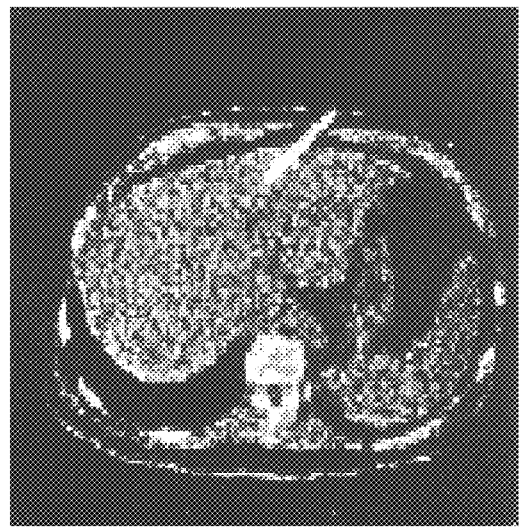
FIG. 9D depicts a simulated CTF image with low contrast at eight seconds into an intervention reconstructed using RAEM.

Further, FIGS. 9A–9D depict representative results for noise reduction resulting from decreased tube current during CTF. FIG. 9A shows an actual image at the beginning of a real-time medial intervention. FIG. 9B shows the image of FIG. 9A with an idealized metal needle inserted eight seconds into a simulated, real-time medical intervention. FIG. 9C shows the image of FIG. 9B reconstructed via the FB approach. The image suffers from significant noise. FIG. 9D shows the image of FIG. 9B reconstructed via the RAEM approach. The image reconstructed via the RAEM approach displays better clarity than the image reconstructed via the FB approach.

In conclusion, the present invention makes use of a row-action or ordered-subset based algorithm in fan-beam or cone-beam geometry for reconstruction of x-ray CTF images suitable for real-time applications. The simulation results demonstrate the present invention's metal artifact and noise reduction capabilities.

Although the present invention has been described with reference to certain preferred embodiments thereof, variations and modification of the present invention can be effected within the spirit and scope of the following claims.

What is claimed is:

1. A system for tomographic image reconstruction in a real-time application comprising:
    (a) an imaging system means for receiving and processing an image;
    (b) a means for generating tomographic projection data of a subject;
    (c) a means for acquiring a nonnegative, initial current image of the subject; and
    (d) a processing means for performing the steps of:
        (i) receiving tomographic projection data of the subject from the projection data generating means;
        (ii) processing the subject projection data and the current image using an ordered-subset based algorithm thereby producing a new current image;
        (iii) outputting the new current image to the imaging system means; and
        (iv) repeating steps (i)–(iii) until the real-time application is complete.

2. The system of claim 1, wherein the projection data generation means performs the steps of:
    (i) acquiring and storing a subset size;
    (ii) measuring projection data of the subject;
    (iii) comparing the quantity of measured projection data to the stored subset size;
    (iv) repeating steps (ii)–(iii) until a subset size of projection data has been measured; and
    (v) outputting the subset of measured projection data associated with the subject.

3. The system of claim 1, wherein the processing means comprises a plurality of parallel processing elements.

4. The system of claim 1, wherein the processing step performed by the processing means comprises the sub-steps of:
    (1) generating a projection mask associated with the subject projection data;
    (2) generating a relaxation matrix from the projection mask;
    (3) estimating the projection data associated with the current image;
    (4) computing the discrepencancy between the subject projection data and the estimated projection data;
    (5) backprojecting the discrepancies over an image reconstruction grid;
    (6) combining the backprojected discrepancies with the current image according to an ordered-subset based algorithm, thereby updating the current image.

5. The system of claim 4, wherein the processing step comprises the additional sub-step of imposing known constraints on the updated current image.

6. The system of claim 2, wherein the processing step performed by the processing means comprises the sub-steps of:
    (1) generating a projection mask associated with the subset of measured projection data;
    (2) generating a relaxation matrix from the projection mask;
    (3) estimating the projection data associated with the current image;
    (4) computing the discrepencancy between the measured projection data and the estimated projection data;
    (5) backprojecting the discrepancies over an image reconstruction grid;
    (6) combining the backprojected discrepancies with current image according to an ordered-subset based algorithm, thereby updating the current image.

7. The system of claim 6, wherein the processing step comprises the additional sub-step of imposing known constraints on the updated current image.

8. A computer-readable, digital storage device storing executable instructions which cause a processor to reconstruct a new tomographic image from a current tomographic image and a subset of acquired projection data by:
    (a) generating a projection mask associated with the subset of projection data;
    (b) generating a relaxation matrix from the projection mask;
    (c) estimating the projection data associated with the current image;
    (d) computing the discrepancy between the subset of projection data and the estimated projection data;
    (e) backprojecting the discrepancies over an image reconstruction grid; and
    (f) combining the backprojected discrepancies with current image according to an ordered-subset based algorithm, thereby updating the current image.

9. The computer-readable, digital storage device of claim 8, storing additional executable instructions which impose known constraints upon the updated current image.

10. The computer-readable, digital storage device of claim 8 wherein the executable instructions are adapted for use on a computer comprising a plurality of parallel processing elements.

11. A system for tomographic image reconstruction in real-time applications comprising:
    (a) an image display system;
    (b) a scanner; and
    (c) a processor for performing the steps of:
        (i) obtaining a positive image of a subject for an initial current image;
        (ii) outputting the initial current image to the image display system;
        (iii) receiving tomographic measured projection data associated with the subject from the scanner;
        (iv) generating a projection mask associated with the measured projection data;
        (v) generating a relaxation matrix from the projection mask;
        (vi) estimating the projection data associated with the current image;
        (vii) computing the discrepencancy between the measured projection data and the estimated projection data;
        (viii) backprojecting the discrepancies over an image reconstruction grid;
        (ix) combining the backprojected discrepancies with current image according to an ordered-subset based algorithm, thereby updating the current image to form a new current image;
        (x) outputting the new current image to the image display system; and
        (xi) repeating steps (iii)–(x) until the real-time application is complete.

12. The system of claim 11, wherein the processor performs the additional step of imposing known constraints upon the new current image prior to outputting the new current image to the image display system.

13. The system of claim 11, wherein the processor comprises a plurality of parallel processing elements.

14. A method for tomographic image reconstruction in a real-time application comprising the steps of:
   (a) initializing a current image with a positive image of a subject;
   (b) acquiring projection data associated with the subject;
   (c) processing the subject projection data and the current image using an ordered-subset based algorithm for producing a new current image;
   (d) outputting the new current image; and
   (e) repeating steps (b)–(d) until the real-time application is complete.

15. The method of claim 14, wherein the processing step comprises the sub-steps of:
   (i) generating a projection mask associated with the subject projection data;
   (ii) generating a relaxation matrix from the projection mask;
   (iii) estimating the projection data associated with the current image;
   (iv) computing the discrepancy between the subject projection data and the estimated projection data;
   (v) backprojecting the discrepancies over an image reconstruction grid; and
   (vi) combining the backprojected discrepancies with the current image according to an ordered-subset based algorithm, thereby updating the current image.

16. The method of claim 15, wherein the processing step comprises the additional sub-step of imposing known constraints upon the new current image prior to outputting the new current image to the image display system.

17. The method of claim 14, wherein the subject projection data acquisition step comprises the sub-steps of:
   (i) acquiring and storing a subset size;
   (ii) measuring projection data of the subject;
   (iii) comparing the quantity of measured projection data to the stored subset size;
   (iv) repeating steps (ii)–(iii) until a subset size of projection data has been measured; and
   (v) outputting the subset of measured projection data associated with the subject.

18. The method of claim 17, wherein the processing step comprises the sub-steps of:
   (i) generating a projection mask associated with the subject projection data;
   (ii) generating a relaxation matrix from the projection mask;
   (iii) estimating the projection data associated with the current image;
   (iv) computing the discrepancy between the subject projection data and the estimated projection data;
   (v) backprojecting the discrepancies over an image reconstruction grid;
   (vi) combining the backprojected discrepancies with the current image according to an ordered-subset based algorithm, thereby updating the current image.

19. The method of claim 18, wherein the processing step comprises the additional sub-step of imposing known constraints upon the new current image prior to outputting the new current image to the image display system.

20. A system for tomographic image reconstruction in a real-time application comprising:
   (a) an imaging system means for receiving and processing an image;
   (b) a means for generating tomographic projection data of a subject;
   (c) a means for acquiring a nonnegative, initial current image of the subject; and
   (d) a processing means for performing the steps of:
      (i) receiving tomographic projection data of the subject from the projection data generating means;
      (ii) processing the subject projection data and the current image using a modified ordered-subset based algorithm thereby producing a new current image;
      (iii) outputting the new current image to the imaging system means; and
      (iv) repeating steps (i)–(iii) until the real-time application is complete.

21. The system of claim 20, wherein the modified ordered-subset based algorithm is a row-action expectation maximization based algorithm.

22. The system of claim 20, wherein the processing means comprises a plurality of parallel processing elements.

23. The system of claim 20, wherein the projection data generation means performs the steps of:
   (i) acquiring and storing a subset size;
   (ii) measuring projection data of the subject;
   (iii) comparing the quantity of measured projection data to the stored subset size;
   (iv) repeating steps (ii)–(iii) until a subset size of projection data has been measured; and
   (v) outputting the subset of measured projection data associated with the subject.

24. The system of claim 20, wherein the processing step performed by the processing means comprises the sub-steps of:
   (1) generating a projection mask associated with the subject projection data;
   (2) generating a relaxation matrix from the projection mask;
   (3) estimating the projection data associated with the current image;
   (4) computing the discrepencancy between the subject projection data and the estimated projection data;
   (5) backprojecting the discrepancies over an image reconstruction grid;
   (6) combining the backprojected discrepancies with the current image according to a modified ordered-subset based algorithm, thereby updating the current image.

25. The system of claim 24, wherein the processing step comprises the additional sub-step of imposing known constraints on the updated current image.

26. The system of claim 25, wherein the modified ordered-subset based algorithm is a row-action expectation maximization based algorithm.

27. The system of claim 23, wherein the processing step performed by the processing means comprises the sub-steps of:
   (1) generating a projection mask associated with the subset of measured projection data;
   (2) generating a relaxation matrix from the projection mask;
   (3) estimating the projection data associated with the current image;
   (4) computing the discrepencancy between the measured projection data and the estimated projection data;

(5) backprojecting the discrepancies over an image reconstruction grid;

(6) combining the backprojected discrepancies with current image according to a modified ordered-subset based algorithm, thereby updating the current image.

28. The system of claim 27, wherein the processing step comprises the additional sub-step of imposing known constraints on the updated current image.

29. The system of claim 28, wherein the modified ordered-subset based algorithm is a row-action expectation maximization based algorithm.

30. A computer-readable, digital storage device storing executable instructions which cause a processor to reconstruct a new tomographic image from a current tomographic image and a subset of acquired projection data by:

(a) generating a projection mask associated with the subset of projection data;

(b) generating a relaxation matrix from the projection mask;

(c) estimating the projection data associated with the current image;

(d) computing the discrepancy between the subset of projection data and the estimated projection data;

(e) backprojecting the discrepancies over an image reconstruction grid; and (f) combining the backprojected discrepancies with current image according to a modified ordered-subset based algorithm, thereby updating the current image.

31. The computer-readable, digital storage device of claim 30, storing additional executable instructions which impose known constraints upon the updated current image.

32. The computer-readable, digital storage device of claim 31, wherein the modified ordered-subset based algorithm is a row-action expectation maximization based algorithm.

33. The computer-readable, digital storage device of claim 30 wherein the executable instructions are adapted for use on a computer comprising a plurality of parallel processing elements.

34. A system for tomographic image reconstruction in real-time applications comprising:

(a) an image display system;

(b) a scanner; and (c) a processor for performing the steps of:
(i) obtaining a positive image of a subject for an initial current image;
(ii) outputting the initial current image to the image display system;
(iii) receiving tomographic measured projection data associated with the subject from the scanner;
(iv) generating a projection mask associated with the measured projection data;
(v) generating a relaxation matrix from the projection mask;
(vi) estimating the projection data associated with the current image;
(vii) computing the discrepencancy between the measured projection data and the estimated projection data;
(viii) backprojecting the discrepancies over an image reconstruction grid;
(ix) combining the backprojected discrepancies with current image according to a modified ordered-subset based algorithm, thereby updating the current image to form a new current image;
(x) outputting the new current image to the image display system; and
(xi) repeating steps (iii)–(x) until the real-time application is complete.

35. The system of claim 34, wherein the processor performs the additional step of imposing known constraints upon the new current image prior to outputting the new current image to the image display system.

36. The system of claim 35, wherein the modified ordered-subset based algorithm is a row-action expectation maximization based algorithm.

37. The system of claim 34, wherein the processor comprises a plurality of parallel processing elements.

38. A method for tomographic image reconstruction in a real-time application comprising the steps of:

(a) initializing a current image with a positive image of a subject;

(b) acquiring projection data associated with the subject;

(c) processing the subject projection data and the current image using a modified ordered-subset based algorithm for producing a new current image;

(d) outputting the new current image; and (e) repeating steps (b)–(d) until the real-time application is complete.

39. The method of claim 38, wherein the modified ordered-subset based algorithm is a row-action expectation maximization based algorithm.

40. The method of claim 38, wherein the processing step comprises the sub-steps of:

(i) generating a projection mask associated with the subject projection data;

(ii) generating a relaxation matrix from the projection mask;

(iii) estimating the projection data associated with the current image;

(iv) computing the discrepancy between the subject projection data and the estimated projection data;

(v) backprojecting the discrepancies over an image reconstruction grid; and (vi) combining the backprojected discrepancies with the current image according to a modified ordered-subset based algorithm, thereby updating the current image.

41. The method of claim 40, wherein the processing step comprises the additional sub-step of imposing known constraints upon the new current image prior to outputting the new current image to the image display system.

42. The method of claim 41, wherein the modified ordered-subset based algorithm is a row-action expectation maximization based algorithm.

43. The method of claim 38, wherein the subject projection data acquisition step comprises the sub-steps of:

(i) acquiring and storing a subset size;

(ii) measuring projection data of the subject;

(iii) comparing the quantity of measured projection data to the stored subset size;

(iv) repeating steps (ii)–(iii) until a subset size of projection data has been measured; and (v) outputting the subset of measured projection data associated with the subject.

44. The method of claim 43, wherein the processing step comprises the sub-steps of:

(i) generating a projection mask associated with the subject projection data;

(ii) generating a relaxation matrix from the projection mask;

(iii) estimating the projection data associated with the current image;
(iv) computing the discrepancy between the subject projection data and the estimated projection data;
(v) backprojecting the discrepancies over an image reconstruction grid;
(vi) combining the backprojected discrepancies with the current image according to a modified ordered-subset based algorithm, thereby updating the current image.

45. The method of claim 44, wherein the processing step comprises the additional sub-step of imposing known constraints upon the new current image prior to outputting the new current image to the image display system.

46. The method of claim 45, wherein the modified ordered-subset based algorithm is a row-action expectation maximization based algorithm.

* * * * *